US010998968B2

(12) United States Patent
Gao et al.

(10) Patent No.: US 10,998,968 B2
(45) Date of Patent: May 4, 2021

(54) METHODS FOR SENDING AND RECEIVING SYNCHRONIZATION SIGNALS AND SIGNALS SUBJECTED TO PERFECT OMNIDIRECTIONAL PRE-CODING IN LARGE-SCALE MIMO SYSTEM

(71) Applicant: SOUTHEAST UNIVERSITY, Nanjing (CN)

(72) Inventors: Xiqi Gao, Nanjing (CN); Xin Meng, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 360 days.

(21) Appl. No.: 16/066,051

(22) PCT Filed: Jul. 4, 2016

(86) PCT No.: PCT/CN2016/088335
§ 371 (c)(1),
(2) Date: Jun. 25, 2018

(87) PCT Pub. No.: WO2017/219389
PCT Pub. Date: Dec. 28, 2017

(65) Prior Publication Data
US 2020/0274613 A1 Aug. 27, 2020

(30) Foreign Application Priority Data

Jun. 21, 2016 (CN) .......................... 201610453957.0

(51) Int. Cl.
H04B 7/26 (2006.01)
H04B 7/0426 (2017.01)
(Continued)

(52) U.S. Cl.
CPC ......... *H04B 7/2678* (2013.01); *H04B 7/0426* (2013.01); *H04B 7/0456* (2013.01); *H04B 7/1555* (2013.01)

(58) Field of Classification Search
CPC combination set(s) only.
See application file for complete search history.

(56) References Cited

U.S. PATENT DOCUMENTS 9,001,924 B1 * 4/2015 Wu .......................... G06F 17/16
375/295
10,701,649 B2 * 6/2020 Lee ...................... H04B 7/0617
(Continued)

FOREIGN PATENT DOCUMENTS

CN 102710309 A * 10/2012

*Primary Examiner* — Un C Cho
*Assistant Examiner* — Rasha K Fayed
(74) *Attorney, Agent, or Firm* — CBM Patent Consulting, LLC

(57) ABSTRACT

An EnodeB or a transmitting device intermittently generates synchronization signals, and then performs perfect omnidirectional pre-coding processing on the synchronization signals; the synchronization signals after perfect omnidirectional pre-coding processing pass through a transmission channel and are then received by a mobile terminal or a receiving device, and the mobile terminal or the receiving device uses the received synchronization signals and local replicas of the synchronization signals for receiving and synchronization processing. An EnodeB or a transmitting device generates vector signals via low-dimensional space-time coding, and then performs perfect omnidirectional pre-coding processing on the vector signals; the transmitted signals after perfect omnidirectional pre-coding processing pass through a transmission channel and are then received by a mobile terminal or a receiving device, and the mobile terminal or the receiving device uses the received signals for signal receiving processing.

8 Claims, 2 Drawing Sheets

(51) Int. Cl.
*H04B 7/0456* (2017.01)
*H04B 7/155* (2006.01)

(56) References Cited

U.S. PATENT DOCUMENTS

| | | | | |
|---|---|---|---|---|
| 2010/0208837 A1* | 8/2010 | Vetter | ............... | H04L 27/2602 |
| | | | | 375/267 |
| 2011/0310994 A1* | 12/2011 | Ko | ............... | H04B 7/0639 |
| | | | | 375/295 |
| 2012/0315938 A1* | 12/2012 | Van Nee | ............... | H04B 7/0434 |
| | | | | 455/507 |
| 2013/0237265 A1* | 9/2013 | Khojastepour | ............... | H04B 7/024 |
| | | | | 455/509 |
| 2014/0204928 A1* | 7/2014 | Sorin | ............... | H04L 7/10 |
| | | | | 370/338 |
| 2015/0063343 A1* | 3/2015 | Abedini | ............... | H04W 56/0045 |
| | | | | 370/350 |
| 2016/0105870 A1* | 4/2016 | Won | ............... | H04B 7/0413 |
| | | | | 370/330 |

* cited by examiner

METHODS FOR SENDING AND RECEIVING SYNCHRONIZATION SIGNALS AND SIGNALS SUBJECTED TO PERFECT OMNIDIRECTIONAL PRE-CODING IN LARGE-SCALE MIMO SYSTEM

TECHNICAL FIELD

The present invention relates to a wireless communication method, and more particularly, to a method of realizing perfect omnidirectional pre-coded synchronization signals and signal transmitting and receiving in a large-scale MIMO system.

BACKGROUND

In recent years, a MIMO (large-scale MIMO) wireless communication system with an EnodeB configured with a large number of antennas has gained wide attentions from the academia and the industry. In the large-scale MIMO system, the EnodeB is generally configured with more than ten antenna units (such as 128 or 256), and serves for dozens of users (such as 40) in the meanwhile. A large number of antenna units of the EnodeB can greatly increase the degree of spatial freedom of wireless communication, greatly improve the transmission rate, spectrum efficiency and power efficiency, and eliminate the interference between cells to a large extent. The increase of the number of antennas makes each antenna unit be made in a smaller size with a lower cost. Using the degree of spatial freedom provided by the large-scale antenna units, the EnodeB of each cell can communicate with many users in the cell on the same time-frequency resource at the same time, thus greatly increasing the spectrum efficiency. A large number of antenna units of the EnodeB also enable each user to have better spatial directivity for uplink and downlink transmission, so that the transmitting power of the EnodeB and a mobile terminal is obviously reduced, and the power efficiency is greatly increased. When the antenna number of the EnodeB is sufficiently large, random channels between each user and the EnodeB can approach to be orthogonal, and the interference between the cell and the users and the effect of noises can be eliminated. The plurality of advantages described above enable the large-scale MIMO to have a magnificent application prospect.

A public channel has a very important effect in a cellular system, and much information of the EnodeB needs to be delivered to the users through the public channel, such as synchronization signals, cell reference signals, control signaling, multimedia broadcast multicast services (MBMS), etc. One basic requirement on the design of the public channel is that the signal transmitted has an omnidirectional property, so as to guarantee reliable coverage. The existing omnidirectional transmitting methods (such as single antenna transmission, cyclic delay diversity (CDD) and space-time block coding (STBC)) are only applied to a MIMO system with few transmitting antennas (no more than eight), and these methods cannot be directly applied to the large-scale MIMO system configured with large-scale array antennas. For example, a traditional method is that a single omnidirectional antenna is used to broadcast signals (one antenna can be selected from a plurality of transmitting antennas for transmitting); however, the selected single antenna has to be equipped with a power amplifier larger and more expensive than other antennas, so as to achieve the same power coverage scope under the condition that all the antennas are used. Since one of the key advantages of the large-scale MIMO is to obviously increase the power efficiency, i.e., the power amplifier configured to each antenna unit can be obviously reduced with the quantity increase of the antennas, it can be seen that, if the single antenna transmission method is directly used in large-scale MIMO, the advantage of the expected power efficiency will be lost. The space-time coding transmission and the cyclic delay diversity (CDD) are omnidirectional diversity transmission technologies widely used in LTE and other systems which not only have difficulty in system design, but also have an application bottleneck problem that pilot overheads are linearly increased with the antenna number of the EnodeB if these two methods are directly expanded and applied in the large-scale MIMO system. In recent years, spatial domain signal expansion or pre-coding methods have been proposed regarding the omnidirectional signal transmission problems in the large-scale MIMO system, but none of these methods can guarantee perfect omnidirectional transmission. The different signal transmitting powers in each spatial direction will affect the synchronization performance and the omnidirectional signal transmission performance to a large extent.

SUMMARY

Object of the invention: the object of the presented invention is to provide a method of realizing perfect omnidirectional pre-coded synchronization signals and signal transmitting and receiving in a large-scale MINO system capable of overcoming the problems in the prior art.

Technical solution: in order to achieve the object, the following technical solution is used in the present invention.

According a method of realizing perfect omnidirectional pre-coded synchronization signal transmitting in a large-scale MIMO system of the present invention, an EnodeB or a transmitting device intermittently generates K×L synchronization signals, then conducts perfect omnidirectional pre-coding processing on the synchronization signals, and conducts pre-multiplication on the synchronization signals by M×K perfect omnidirectional pre-coding matrix W to obtain M×L transmitting signals as digital baseband signals transmitted by an antenna array, wherein K is the dimension of the synchronization signals, $2 \leq K < M$, M is the antenna number of the EnodeB, and L is the length of the synchronization signals in one transmitting period.

Further, the perfect omnidirectional pre-coding matrix W satisfies the following design criteria:

(1) the power of the transmitted signals is the same in each spatial direction to guarantee perfect omnidirectional coverage; and (2) the power of the transmitted signals on each antenna unit is the same, and the power efficiency of each radio frequency channel and the antenna array is maximized.

Further, the perfect omnidirectional pre-coding matrix W meets the following conditions:

(1) the sum of the squared absolute values of the M-point discrete time Fourier transform of each column of the perfect omnidirectional pre-coding matrix W is a constant;

(2) all the row vectors of the perfect omnidirectional pre-coding matrix W have the same 2-norm; and (3) all the column vectors of the perfect omnidirectional pre-coding matrix W have the same 2-norm and are mutually orthogonal.

Further, the perfect omnidirectional pre-coding matrix W is composed of k sequences in a multiphase complementary orthogonal sequence set, and the multiphase complementary orthogonal sequence set comprises K sequences with a length of M.

Further, when K=2, two column sequences in the multiphase complementary orthogonal sequence set constitute a Golay sequence pair.

Further, the perfect omnidirectional pre-coding matrix W is obtained through the following method: firstly, a perfect omnidirectional pre-coding matrix W' with a dimension of $$\frac{M}{K} \times K$$

is constructed, and then K-times zero insertion processing is conducted to each column of the perfect omnidirectional pre-coding matrix W' to obtain the perfect omnidirectional pre-coding matrix W, and each row of the perfect omnidirectional pre-coding matrix W only has one nonzero element.

Further, the perfect omnidirectional pre-coding matrix W is obtained through the following method: post-multiplication is conducted to a perfect omnidirectional pre-coding matrix $W_0$ by a K×K unitary matrix U to obtain the M×K perfect omnidirectional pre-coding matrix W.

According to the method of realizing perfect omnidirectional pre-coded synchronization signal receiving in a large-scale MIMO system of the present invention, synchronization signals after perfect omnidirectional pre-coding processing pass through a transmission channel and are then received by a mobile terminal or a receiving device, and the mobile terminal or the receiving device uses the received synchronization signals and local replicas of the synchronization signals for receiving and synchronization processing.

Further, the process that the mobile terminal or the receiving device uses the received synchronization signals and the local replicas of the synchronization signals for receiving and synchronization processing comprises the following steps of:

S1: conducting a cross-correlation operation to synchronization signals and local replicas of the synchronization signals received from timing position θ by the mobile terminal or the receiving device, and obtaining the energy;

S2: combining the energy corresponding to a plurality of delayed paths to obtain the total energy; and S3: comparing the total energy with a threshold: if the total energy is greater than the threshold, judging that the timing position θ is aligned; otherwise, judging that the timing position θ is not aligned, and changing the timing position θ, and then returning to step S1.

According to the method of realizing perfect omnidirectional pre-coded signal transmitting in a large-scale MIMO system of the present invention, an EnodeB or a transmitting device generates K-dimension vector signals via low-dimensional space time coding, then conducts perfect omnidirectional pre-coding processing on the vector signals, and conducts pre-multiplication on each vector by M×K perfect omnidirectional pre-coding matrix W to obtain M-dimension vector transmitting signals as digital baseband signals transmitted by an antenna array, wherein K<M, and M is the antenna number of the EnodeB.

Further, the transmitting signals comprise a pilot signal and a data signal, the EnodeB or the transmitting device intermittently inserts the pilot signal while transmitting the data signal, and the data signal and the pilot signal are the same signals after the same perfect omnidirectional pre-coding processing by using the same perfect omnidirectional pre-coding matrix.

Further, the perfect omnidirectional pre-coding matrix W satisfies the following design criteria:

(1) the power of the transmitted signal is the same in each spatial direction to guarantee perfect omnidirectional coverage; and (2) the power of the transmitted signals on each antenna unit is the same, and the power efficiency of each radio frequency channel and the antenna array is maximized.

Further, the perfect omnidirectional pre-coding matrix W satisfies the following design criteria: the diversity order of a high-dimensional space-time signal after the perfect omnidirectional pre-coding is the same as the diversity order of a low-dimensional space-time signal without the perfect omnidirectional pre-coding.

Further, the perfect omnidirectional pre-coding matrix W meets the following conditions:

(1) the sum of the squared absolute values of the M-point discrete time Fourier transform of each column of the perfect omnidirectional pre-coding matrix W is a constant;

(2) all the row vectors of the perfect omnidirectional pre-coding matrix W have the same 2-norm; and (3) all the column vectors of the perfect omnidirectional pre-coding matrix W have the same 2-norm and are mutually orthogonal.

Further, the perfect omnidirectional pre-coding matrix W is composed of k sequences in a multiphase complementary orthogonal sequence set, and the multiphase complementary orthogonal sequence set comprises K sequences with a length of M.

Further, when K=2, two column sequences in the multiphase complementary orthogonal sequence set constitute a Golay sequence pair.

Further, the perfect omnidirectional pre-coding matrix W is obtained through the following method: firstly, a perfect omnidirectional pre-coding matrix W' with a dimension of $$\frac{M}{K} \times K$$

is constructed, and then K-times zero insertion processing is conducted to each column of the perfect omnidirectional pre-coding matrix W' to obtain the perfect omnidirectional pre-coding matrix W, and each row of the perfect omnidirectional pre-coding matrix W only has one nonzero element.

Further, the perfect omnidirectional pre-coding matrix W is obtained through the following method: post multiplication is conducted to a perfect omnidirectional pre-coding matrix $W_0$ by a K×K unitary matrix U to obtain the M×K perfect omnidirectional pre-coding matrix W.

According to the method of realizing perfect omnidirectional pre-coded signal receiving in a large-scale MIMO system of the present invention, the transmitting signals after perfect omnidirectional pre-coding processing pass through a transmission channel and are then received by a mobile terminal or a receiving device, and the mobile terminal or the receiving device uses the received transmitting signals for signal receiving processing.

Further, during the signal receiving processing, the channel estimation of the mobile terminal or the receiving device and data signal detection are implemented on the equivalent dimension-reduced channel of a perfect omnidirectional pre-coding domain; the estimated value of the equivalent channel parameter of the pre-coding domain is obtained by receiving a pilot signal through the channel estimation; space time decoding is conducted to the equivalent channel of the pre-coding domain by receiving the data signal and the estimated value of the channel parameter to obtain the recovered data signal; and the equivalent channel of the pre-coding domain is the actual high-dimensional channel multiplied by the perfect omnidirectional pre-coding matrix W.

Beneficial effects: compared with the prior art, the present invention has the following beneficial effects:

(1) the power of the signals transmitted by the EnodeB is the same in each spatial direction, which has a perfect omnidirectional coverage effect;

(2) the power of the signals transmitted by the EnodeB on each antenna is the same, which can maximize the power efficiency;

(3) dimension reduction transmission is realized through the perfect omnidirectional pre-coding method, which can greatly reduce the pilot overhead needed in data transmission, greatly decrease the complexity of space-time coding and decoding, and greatly improve the overall efficiency of the omnidirectional signal transmission; and (4) diversity gains can be obtained, and the reliability of the omnidirectional signal transmission is improved.

DETAILED DESCRIPTION

The technical solutions of the present invention are further described hereinafter with reference to the embodiments and the drawings.

For large-scale MIMO system, and taking a single cell into consideration, a large-scale antenna array configured to an EnodeB has a plurality of sectors, each sector is composed of a lot of antenna units; when an omnidirectional antenna or an antenna with a 120-degree sector area is used in each antenna unit, the distance between adjacent antenna units can be designed as $\lambda/2$ and $\lambda/\sqrt{3}$, wherein $\lambda$ is a carrier wavelength. A circular array or other array structures convenient to install can also be used as the large-scale antenna array. Each antenna unit in the large-scale antenna array is connected to a digital baseband processing unit through respective receiving and transmitting radio frequency units, analogue-to-digital/digital-to-analogue conversion units, digital optical modules and optical fiber transmission channels.

Figure 1:
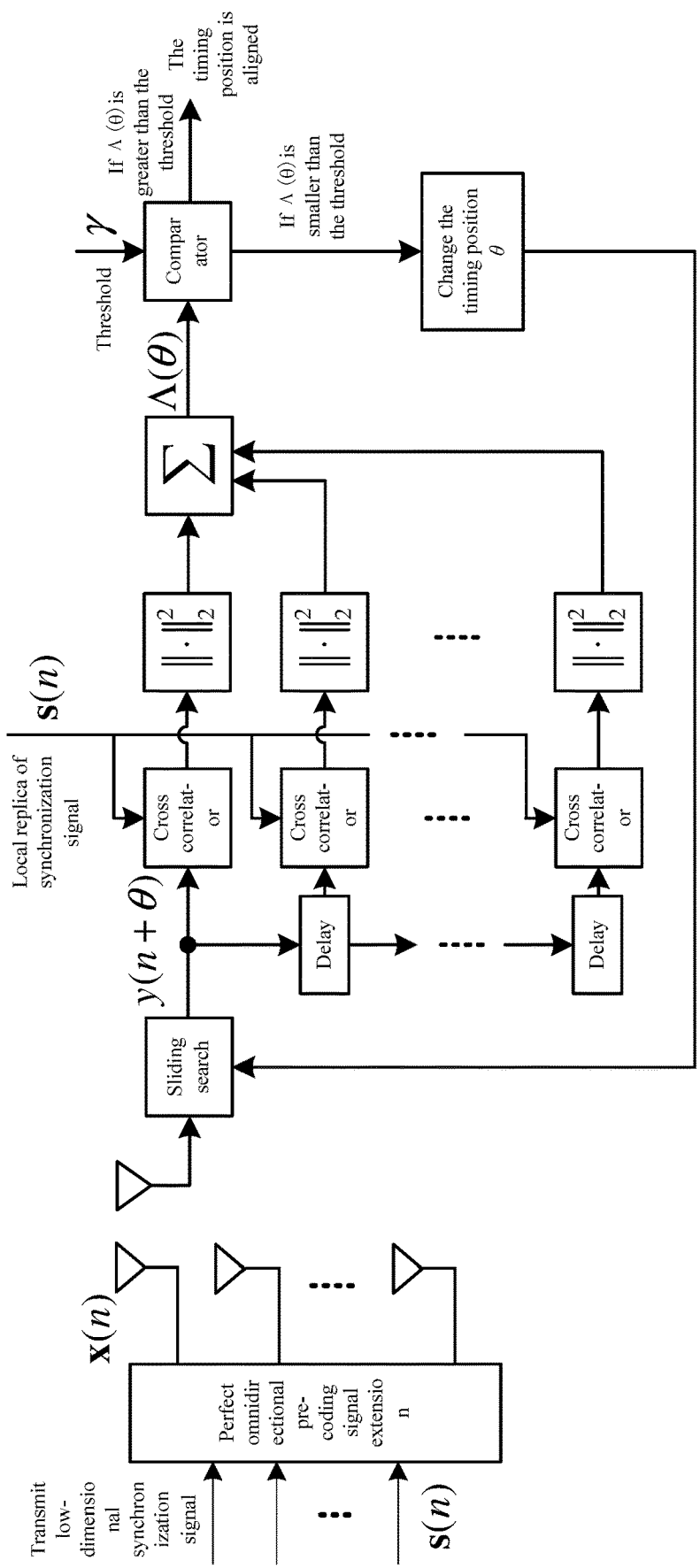
FIG. 1 is a flow chart of a method of realizing perfect omnidirectional pre-coded synchronization signal transmitting and receiving in a large-scale MIMO system according to the present invention.

The present invention discloses a method of realizing perfect omnidirectional pre-coded synchronization signal transmitting in a large-scale MIMO system. As shown in FIG. 1, an EnodeB or a transmitting device intermittently generates K×L synchronization signals, then conducts perfect omnidirectional pre-coding processing on the synchronization signals, and conducts pre-multiplication on the synchronization signals by M×K perfect omnidirectional pre-coding matrix W to obtain M×L transmitting signals as digital baseband signals transmitted by an antenna array, wherein K is the dimension of the synchronization signals, $2 \leq K < M$, M is the antenna number of the EnodeB, and L is the length of the synchronization signals in one transmitting period.

A downlink for the EnodeB to transmit and a downlink for a mobile terminal to receive is considered. When transmitting synchronization signals, a broadband multipath channel of a discrete time domain is considered. In addition, the receiving of a single mobile terminal is considered in general, the number of the antenna unit configured to the EnodeB is set as M, and the mobile terminal is configured with a single antenna.

At a transmitting side, a K-dimension synchronization signal s(n), n=0, 1, ..., L−1, with a length of L(K is more than or equal to 2, and is less than M) is generated firstly, and the energy of all K-path components shall be the same, and mutually orthogonal, i.e., $$\sum_{n=0}^{L-1} s(n)(s(n))^H = c \cdot I_k;$$

wherein, c is a constant, and $I_K$ is a K×K identity matrix; afterwards, perfect omnidirectional pre-coding signal extension processing is conducted to the s(n) to obtain an M-dimension vector transmitting signal X(n)=Ws(n), wherein W is an M×K perfect pre-coding matrix, and the obtained signal x(n) is used as a discrete time digital baseband signal transmitted by the large-scale antenna array.

The present invention further discloses a method of realizing perfect omnidirectional pre-coded synchronization signal receiving in a large-scale MIMO system. As shown in FIG. 1, at a receiving side, a discrete time digital baseband signal of continuous L points obtained at the timing position θ of a single receiving antenna of a mobile terminal or receiving device is represented by y(n+θ), n=0, 1, ..., L−1. Across-correlation operation is conducted to the y(n+θ) and the local replica of the synchronization signal s(n), and the energy of related value is obtained, then the energy of a plurality of delayed path positions is combined, and the total energy obtained is compared with a threshold. If the total energy is greater than the threshold, then the timing position θ is judged to be aligned, if the total energy is smaller than the threshold, then the timing position θ is judged to be not aligned, and the timing position θ is changed to repeat the cross-correlation operation and the threshold comparison process above, until the timing position θ is aligned, so as to obtain the synchronization timing position information.

The K-dimension synchronization signal s(n), n=0, 1, ..., L−1, with a length of L can be generated according to the existing classic sequence, such as Zadoff-Chu sequence, Golay sequence, etc. Taking the condition of the Zadoff-Chu sequence and K=2 as an example, the s(n) can be obtained through conducting different cycle shifts on the same Zadoff-Chu sequence, such as:

$$[s(0)\ s(1)\ \ldots\ s(L-1)] = \begin{bmatrix} c_0 & \ldots & c_{L/2-1} & c_{L/2} & \ldots & c_{L-1} \\ c_{L/2} & \ldots & c_{L-1} & c_0 & \ldots & c_{L/2-1} \end{bmatrix} \quad (1)$$

In the formula (1), the first row $[c_0, c_1, \ldots, c_{L-1}]$ on the right hand side represents a Zadoff-Chu sequence with a length of L, and the second row is equivalent to conducting a L/2 cycle shift on $[c_0, c_1, \ldots, c_{L-1}]$. Assuming that a channel is approximately unchanged in each time when transmitting the synchronization signal, the digital baseband signal y(n) received by the receiving side at the timing position θ can be represented as follows:

$$y(n+\theta) = \sum_{p=0}^{P-1} h_p W s(n+\theta-\tau_p) + z(n) \quad (2)$$

In the formula (2), P is the total number of delayed paths distinguishable to a channel between the EnodeB and the user, $h_p$ is an M-dimension channel vector corresponding to a $p^{th}$ delayed path, $\tau_p$ is the delay corresponding to the $p^{th}$ delayed path, and z(n) represents additive white gaussian noise.

Across-correlation operation is conducted on the receiving signal y(n+θ), n=0, 1, ..., L−1, of the continuous L points at the timing position θ and the local replicas of the synchronization signal to obtain the energy of related values, and combine the energy of a plurality of delayed paths, i.e.:

$$\Lambda(\theta) = \sum_{p=0}^{P-1} \left\| \sum_{n=0}^{L-1} y(n+\theta+\tau_p)(s(n))^H \right\|_2^2 \quad (3)$$

$\|\cdot\|_2$ represents a vector 2-norm. Λ (θ) is compared with a threshold, if Λ (θ) is greater than the threshold, then the timing position θ is judged to be aligned, if Λ (θ) is smaller than the threshold, then the timing position θ is judged to be not aligned, and the timing position θ is changed to repeat the cross-correlation operation and the threshold comparison process above, until the timing position θ is aligned.

Figure 2:
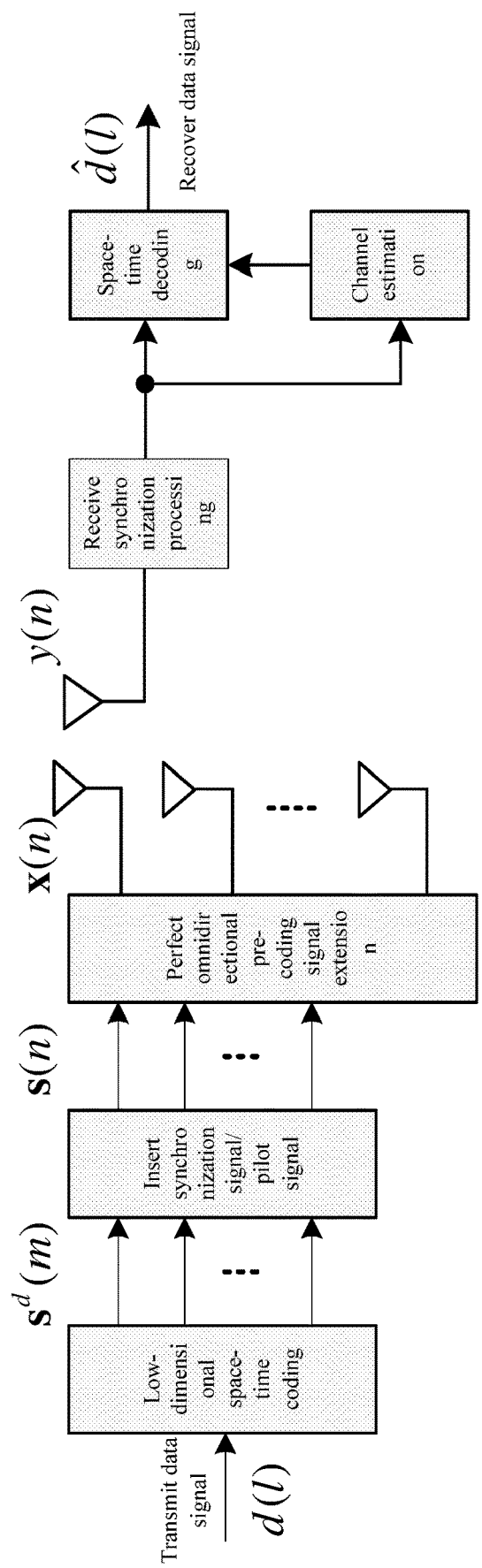
FIG. 2 is a flow chart of a method of realizing perfect omnidirectional pre-coded signal transmitting and receiving in a large-scale MIMO system according to the present invention.

The present invention further discloses a method of realizing perfect omnidirectional pre-coded signal transmitting in a large-scale MIMO system. As shown in FIG. 2, an EnodeB or a transmitting device generates K-dimension vector signals via low-dimensional space-time coding, then conducts perfect omnidirectional pre-coding processing on the vector signals, and conducts pre-multiplication on each vector by M×K perfect omnidirectional pre-coding matrix W to obtain M-dimension vector transmitting signals as digital baseband signals transmitted by an antenna array. Wherein, the transmitting signals are a pilot signal and a data signal.

A downlink for the EnodeB to transmit and a downlink for a mobile terminal to receive is considered. When transmitting data signals, only a narrowband channel of a discrete time domain is considered; there is only a single composite path in the considered narrowband channel, the considered narrowband channel can be deemed as a subcarrier channel in a regular broadband OFDM system, and accordingly, the digital baseband transmitting and receiving signals related are signals on time-frequency resources of the broadband OFDM system. In addition, the receiving of a single mobile terminal is considered in general, the number of the antenna units configured to the EnodeB is set as M, and the mobile terminal is configured with a single antenna.

At a transmitting side, a data signal d(l) is transmitted to firstly generate a K-dimension vector signal $s^d(m)$ (K is smaller than M) via low-dimensional space-time coding; then a K-dimension vector pilot signal $s^p(m')$, m'=0, 1, ..., P−1, with a length of P is periodically inserted; a K-dimension vector transmitting signal s(n) is generated; afterwards, perfect omnidirectional pre-coding signal extension processing is conducted on the s(n) to obtain an M-dimension vector transmitting signal x(n)=Ws(n), wherein W is M×K perfect omnidirectional pre-coding matrix, and the obtained signal x(n) is used as the digital baseband signal transmitted by the large-scale antenna array.

The present invention further discloses a method of realizing perfect omnidirectional pre-coded signal receiving in a large-scale MIMO system. As shown in FIG. 2, a digital baseband signal obtained by a single receiving antenna of a mobile terminal or receiving device is represented by y(n) at a receiving side, the y(n) includes a receiving pilot signal $y^p(m')$ and a receiving data signal $y^p(m')$; the receiving pilot signal $y^p(m')$ is used to obtain an estimated value of a channel parameter through channel estimation; then space-time decoding is conducted by using the receiving data signal $y^p(m')$ and the estimated value of the channel parameter, so as to obtain the recovered data signal $\hat{d}(l)$.

The low-dimensional space-time coding can be various space-time transmission methods used in a regular small-scale MIMO system, such as space-time block code transmission, or cyclic time delay diversity transmission, or compromise transmission method of multiplex and diversity. Estimation on the channel parameter of the receiving side is estimation on an equivalent channel parameter of a pre-coding domain, and the space-time decoding is also implemented on the equivalent channel. In one pilot insertion period, there are P pilot frequency vector signals and D data vector signals; assuming that the channel is approximately unchanged, the digital baseband signal y(n) received by the receiving side can be represented as follows:

$$y(n) = hWs(n) + z(n) \quad (4)$$
$$= \tilde{h}s(n) + z(n)$$

In the formula (4), h is an M-dimension channel vector between the EnodeB and the user, z(n) represents additive white gaussian noise, $\tilde{h}=hW$ is an equivalent channel vector of the pre-coding domain, and the dimension thereof is K. The receiving pilot signal $y^p(m')$ and the receiving data signal $y^d(m)$ are separated from the receiving signals, and can be respectively represented as follows:

$$y^p(m')=\tilde{h}s^p(m')+z^p(m'), \ m'=0,1,\ldots,P-1 \quad (5)$$

$$y^d(m)=\tilde{h}s^d(m)+z^d(m), \ m=0,1,\ldots,D-1 \quad (6)$$

In the formula (5), $z^p(m')$ and $z^d(m)$ respectively represent corresponding noise phases. The channel estimation and the space-time decoding at the receiving side are respectively based on signal relation expressions given by the two formulas above.

Set $y^p=[y^p(0) \ y^p(1) \ldots y^p(P-1)]$, $S^p=[s^p(0) \ s^p(1) \ldots s^p(P-1)]$ and $z^p=[z^p(0) \ z^p(1) \ldots z^p(P-1)]$, and set $S^p$ meet that $S^p(S^p)^H=I_K$, wherein a superscript H represents conjugate transpose, $I_K$ is a K×K identity matrix, and then the least square estimation of h can be calculated by the following formula:

$$\hat{\tilde{h}}=y^p(S^p)^H \quad (7)$$

In order to obtain the estimated value of $\tilde{h}$ at the receiving side, the pilot length P needs to be greater than or equal to K, but can be smaller than M, which is different from a regular omnidirectional diversity transmission method without pre-coding. In the transmission method without pre-coding, in order to conduct coherent detections at the mobile terminal, the instantaneous channel information h needs to be known, and the EnodeB side needs to transmit suitable downlink pilot to help the mobile terminal conduct the channel estimation. Moreover, the pilot length cannot be smaller than M. High pilot overhead can be brought about in case that the number M of the antenna units is very big, which severely reduces the system performance. The omnidirectional pre-coding diversity transmission method provided by the present invention can enable the pilot overhead not to be increased with the increase of M, but only relevant to the spatial dimension K of the low-dimensional space-time coding selected, and the pilot overhead can be reduced by M/K times.

The recovered data signal $\hat{d}(l)$ can be obtained by using the estimated value of $\tilde{h}$ obtained in this way, the data signal relation expression given in the formula (6), and the specific signal generation method of the space-time coding. A signal detection example is given as follows when K=2 and Alamouti space-time coding is used. Set D=KB, i.e., there are B space-time code blocks in one pilot period, then a transmitting data signal matrix of a $b^{th}$ block can be represented as:

$$S^d(b) = [s^d(2b) \ s^d(2b+1)] = \begin{bmatrix} d(2b) & -d^*(2b+1) \\ d(2b+1) & d^*(2b) \end{bmatrix} \quad (8)$$

In the formula (8), b=0, . . . , B−1, and a superscript * represents conjugate. A receiving data signal vector of the $b^{th}$ block can be represented as:

$$y^d(b)=[y^d(2b)y^d(2b+1)]=\tilde{h}S^d(b)+z^d(b) \quad (9)$$

In the formula (9), $z^d(b)=[z^d(2b) \ z^d(2b+1)]$. The estimated value $\hat{d}(l)$ of the transmitting data signal d(l) at the receiving side can be calculated by the following formula:

$$[\hat{d}(2b) \ \hat{d}(2b+1)] = [y^d(2b) \ (y^d(2b+1))^*] \begin{bmatrix} \hat{h}_1^* & \hat{h}_2^* \\ \hat{h}_2 & -\hat{h}_1 \end{bmatrix} \quad (10)$$

It can be seen from this specific embodiment that: in the omnidirectional pre-coding diversity transmission method provided by the present invention, implementing the space-time decoding on the equivalent channel can obviously reduce the spatial dimension of the equivalent channel, and remarkably decrease the complexity of the space-time decoding. Therefore, the complexity of the space-time coding and decoding is also obviously decreased while the pilot overhead is obviously reduced. In a wireless transmission system having channel coding, the transmitting signal data signal d(l) is the signal obtained after channel coding, interleaving and modulation symbol mapping of an information bit sequence. At the receiving side, after an estimated value $\hat{d}(l)$ of d(l) is obtained, de-mapping, de-interleaving and channel decoding are needed to recover the information bit sequence.

In the omnidirectional transmission method based on the pre-coding signal extension processing above, the omnidirectional transmission problem in the large-scale MINO system is converted into the design problem of the perfect omnidirectional pre-coding matrix W and the transmission of low-dimensional space-time signals (including the synchronization signal and the data signals). Various space-time transmission methods used in the regular small-scale MIMO transmission system can be used in the transmission of the low-dimensional space-time signals, including space-time block code transmission, cyclic delay diversity transmission, and compromise of multiplex and diversity. In this case, the design of the perfect omnidirectional pre-coding matrix W becomes the key to affect the transmission performance. In order to guarantee the transmission performance, the perfect omnidirectional pre-coding matrix W shall satisfy the following design criteria:

(1) the power of the signal transmitted from the EnodeB side is the same in each spatial direction to guarantee perfect omnidirectional coverage;

(2) the power of the transmitting signals on each antenna unit of the EnodeB side is the same, and the power efficiency of each radio frequency channel and the large-scale antenna array is maximized; and (3) the diversity can reach to the diversity used in the low-dimensional space time signals.

Assuming that the expected values of various elements of a transmitting signal vector s(n) are zero, and a variance is $\sigma_s^2$, and the condition of independent identical distribution is met, i.e., $E\{s(n)\}=0$, and $E\{s(n)(s(n))^H\}=\sigma_s^2 I_K$, wherein, $E\{\cdot\}$ represents an expectation-step, and 0 represents a vector the elements of which are all 0. In this case, in order to guarantee the transmission performance, the perfect omnidirectional pre-coding matrix W shall satisfy the following three design criteria:

(1) the sum of the squared absolute values of the M-point discrete time Fourier transform of each column of W is a constant;

(2) all the M rows of W have the same 2-norm; and (3) all the columns of W have the same 2-norm and are mutually orthogonal.

In general, the three design standards above can be specifically described as the three conditions below:

$$f_M(\omega)WW^H(f_M(\omega))^H = K, \forall \omega \in [0, 1] \quad (11)$$

$$\text{diag}(WW^H) = \frac{K}{M}1_M \quad (12)$$

$$W^H W = I_K \quad (13)$$

Wherein, diag( ) represents that a vector formed by leading diagonal elements of the matrix is taken, $1_M$ represents a M-dimension vector in which all the elements is 1, and $$f_M(\omega) = \frac{1}{\sqrt{M}}[1, e^{-j2\pi\omega}, \ldots, e^{-j2\pi(M-1)\omega}]$$

represents the Fourier transform vector of the discrete time of an M-point sequence having a frequency of ω.

The perfect omnidirectional pre-coding matrix W with a dimension of M×K can be obtained through one of the following methods:

1) A $K^{th}$ column of the perfect omnidirectional pre-coding matrix W can be composed of K sequences in a multiphase complementary orthogonal sequence set (which includes K sequences with a length of M), and when K=2, the typical multiphase complementary orthogonal sequence set constitute a Golay sequence pair;

2) a perfect omnidirectional pre-coding matrix W' with a dimension of $$\frac{M}{K} \times K$$

can be firstly composed through the method 1), and each column of the perfect omnidirectional pre-coding matrix W' with a dimension of M×K can be obtained through conducting K-times zero insertion processing on each column of W'; and 3) if a perfect omnidirectional pre-coding matrix meeting the formulas (11), (12) and (13) above is known, a new perfect omnidirectional pre-coding matrix is obtained through conducting post-multiplication on the known matrix by any K×K unitary matrix U.

Two design embodiments of the perfect omnidirectional pre-coding matrix W meeting the formulas (11), (12) and (13) are provided:

First Embodiment

Various columns of a perfect omnidirectional pre-coding matrix W can be composed of various sequences in a multiphase complementary orthogonal sequence set. One multiphase complementary orthogonal sequence set $\{a_0, a_1, \ldots, a_{K-1}\}$ is considered, wherein each sequence $\{a_0, a_1, \ldots, a_{K-1}\}$ is a multiphase sequence with a length of M, the multiphase indicates that $$|a_{k,0}| = |a_{k,1}| = \ldots = |a_{k,M-1}| = \frac{1}{\sqrt{M}},$$

and all the K sequences in the set meet the complementary property and the orthogonal property at the same time. The complementary property indicates that the sum of respective non-periodic auto-correlation functions of the K sequences is a δ function, i.e.:

$$\sum_{k=0}^{K-1} \sum_{n=0}^{M-m-1} a_{k,n} a_{k,n+m}^* = K\delta(m) \tag{14}$$

The orthogonal property indicates that:

$$\sum_{n=0}^{M-1} a_{k,n} a_{k',n}^* = \delta(k - k') \tag{15}$$

Then the perfect omnidirectional pre-coding matrix W is constructed as:

W=[$a_0, a_1, \ldots, a_{K-1}$] (16). When K=2, the typical multiphase complementary orthogonal sequence set is a Golay sequence pair.

Second embodiment: a perfect omnidirectional pre-coding matrix W' with a dimension of $$\frac{M}{K} \times K$$

can be composed firstly through the first embodiment, which is donated as:

W'=[$w_0, w_1, \ldots, w_{K-1}$] (17)

Then each column of the perfect omnidirectional pre-coding matrix W with a dimension of M×K can be respectively obtained through conducting K-times zero insertion processing to each column of W, i.e.:

$$W=[P_0 w_0, P_1 w_1, \ldots, P_{K-1} w_{K-1}] \tag{18}$$

In the formula (18), $P_k = [[I_M]_{:,k}, [I_M]_{:,k+K}, \ldots, [I_M]_{:,k+M-K}]$ represents a K-times zero insertion matrix with a dimension of $$M \times \frac{M}{K}, [I_M]_{:,k}$$

represents that a $k^{th}$ column of an M×M identity matrix is taken, and the value insertion conducted according to the formula (18) can guarantee that each row of the perfect omnidirectional pre-coding matrix W obtained only has one nonzero element. Taking K=2 and M=64 as an example, the perfect omnidirectional pre-coding matrix W' with a dimension of 32×2 is denoted as:

$$W' = \begin{bmatrix} w_{0,0} & w_{1,0} \\ w_{0,1} & w_{1,1} \\ \vdots & \vdots \\ w_{0,31} & w_{1,31} \end{bmatrix} \tag{19}$$

Then the perfect omnidirectional pre-coding matrix W with a dimension of 64×2 after the value insertion is as follows:

$$W = \begin{bmatrix} w_{0,0} & 0 \\ 0 & w_{1,0} \\ w_{0,1} & 0 \\ 0 & w_{1,1} \\ \vdots & \vdots \\ w_{0,31} & 0 \\ 0 & w_{1,31} \end{bmatrix} \tag{20}$$

It can be seen that each row therein only has one nonzero element.

In the embodiment provided by the application, it should be understood that the disclosed methods can be implemented through other methods with departing from the spirit and scope of the application. The current embodiments are demonstrative examples merely, and shall be not restrictive, and the specific contents given shall not limit the object of the application. For example, multiple units or components can be combined or integrated into another system, or some features can be ignored or not executed. The disclosed perfect omnidirectional pre-coding matrix can be digitally implemented in a discrete time domain, or implemented in an analogue domain, or can be co-implemented in the analogue and digital domains.

The description above is only detailed embodiments of the invention, but the protection scope of the invention is not limited to this. Any change or replacement that can be easily made by those skilled in the art within the technical scope disclosed by the invention shall all fall within the protection scope of the invention. Therefore, the protection scope of the invention shall be subjected to the protection scope of the claims.

What is claimed is:

1. A method of realizing perfect omnidirectional pre-coded synchronization signal transmission in a large-scale MIMO system, wherein an EnodeB or a transmitting device intermittently generates K×L synchronization signals, then conducts perfect omnidirectional pre-coding processing on the synchronization signals, and conducts premultiplication on the synchronization signals by an M×K perfect omnidirectional pre-coding matrix W to obtain M×L signals as digital baseband signals transmitted by an antenna array, wherein K is the dimension of the synchronization signals, 2≤K<M, M is the number of the EnodeB antennas, and L is the length of the synchronization signals in one transmitting period;

wherein the perfect omnidirectional pre-coding matrix W is obtained through the following method: firstly, a perfect omnidirectional pre-coding matrix W' with a dimension of $$\frac{M}{K} \times K$$

is constructed, and then K-times zero insertion processing is conducted to each column of the perfect omnidirectional pre-coding matrix W' to obtain the perfect omnidirectional pre-coding matrix W, and each row of the perfect omnidirectional pre-coding matrix W only has one nonzero element.

2. The method of realizing perfect omnidirectional pre-coded synchronization signal transmitting in a large-scale MIMO system according to claim 1, wherein the perfect omnidirectional pre-coding matrix W satisfies the following design criteria:
   (1) the power of the transmitted signals is the same in each spatial direction to guarantee perfect omnidirectional coverage; and
   (2) the power of the transmitted signals on each antenna is the same, and the power efficiency of each radio frequency channel and the antenna array is maximized.

3. The method of realizing perfect omnidirectional pre-coded synchronization signal transmitting in a large-scale MIMO system according to claim 1, wherein the perfect omnidirectional pre-coding matrix W meets the following conditions:
   (1) the sum of the squared absolute values of the discrete time Fourier transform of an M-point sequence in each column of the perfect omnidirectional pre-coding matrix W is a constant;
   (2) all the row vectors of the perfect omnidirectional pre-coding matrix W have the same 2-norm; and
   (3) all the column vectors of the perfect omnidirectional pre-coding matrix W have the same 2-norm and are mutually orthogonal.

4. The method of realizing perfect omnidirectional pre-coded synchronization signal transmitting in a large-scale MIMO system according to claim 1, wherein the perfect omnidirectional pre-coding matrix W is composed of k sequences in a multiphase complementary orthogonal sequence set, and the multiphase complementary orthogonal sequence set comprises K sequences with a length of M.

5. The method of realizing perfect omnidirectional pre-coded synchronous signal transmitting in a large-scale MIMO system according to claim 4, wherein when K=2, two column sequences in the multiphase complementary orthogonal sequence set constitute a Golay sequence pair.

6. The method of realizing perfect omnidirectional pre-coded synchronization signal transmitting in a large-scale MIMO system according to claim 1, wherein the perfect omnidirectional pre-coding matrix W is obtained through the following method: post-multiplication is conducted to a perfect omnidirectional pre-coding matrix $W_0$ by a K×K unitary matrix U to obtain the M×K perfect omnidirectional pre-coding matrix W.

7. A method of realizing perfect omnidirectional pre-coded synchronization signal receiving in a large-scale MIMO system, wherein synchronization signals after perfect omnidirectional pre-coding processing pass through a transmission channel and are then received by a mobile terminal or a receiving device, and the mobile terminal or the receiving device uses the received synchronization signals and local replicas of the synchronization signals for receiving and synchronization processing;

wherein the perfect omnidirectional pre-coding matrix W is obtained through the following method: firstly, a perfect omnidirectional pre-coding matrix W' with a dimension of $$\frac{M}{K} \times K$$

is constructed, and then K-times zero insertion processing is conducted to each column of the perfect omnidirectional pre-coding matrix W' to obtain the perfect omnidirectional pre-coding matrix W, and each row of the perfect omnidirectional pre-coding matrix W only has one nonzero element.

8. The method of realizing perfect omnidirectional pre-coded synchronization signal receiving in a large-scale MIMO system according to claim 7, wherein the process that the mobile terminal or the receiving device uses the received synchronization signals and the local replicas of the synchronous signals for receiving and synchronization processing comprises the following steps of:
   S1: conducting a cross-correlation operation to synchronization signals and local replicas of the synchronization signals received from timing position θ by the mobile terminal or the receiving device, and obtaining the energy;
   S2: combining the energy corresponding to a plurality of delayed paths to obtain the total energy; and
   S3: comparing the total energy with a threshold: if the total energy is greater than the threshold, judging that the timing position θ is aligned; otherwise, judging that the timing position θ is not aligned, and changing the locating position θ, and then returning to step S1.

* * * * *